United States Patent
Sheaf et al.

(10) Patent No.: US 11,421,592 B2
(45) Date of Patent: Aug. 23, 2022

(54) GAS TURBINE ENGINE

(71) Applicant: ROLLS-ROYCE plc, London (GB)

(72) Inventors: Christopher T J Sheaf, Derby (GB); Richard G Stretton, Ashby-de-la-Zouch (GB); Chia Hui Lim, Derby (GB)

(73) Assignee: ROLLS-ROYCE plc, London (GB)

( * ) Notice: Subject to any disclaimer, the term of this patent is extended or adjusted under 35 U.S.C. 154(b) by 84 days.

(21) Appl. No.: 16/416,766

(22) Filed: May 20, 2019

(65) Prior Publication Data
US 2019/0383215 A1 Dec. 19, 2019

(30) Foreign Application Priority Data

Jun. 15, 2018 (GB) ...................................... 1809822
Sep. 24, 2018 (GB) ...................................... 1815494

(51) Int. Cl.
*F02C 7/00* (2006.01)
*F02C 7/04* (2006.01)
(Continued)

(52) U.S. Cl.
CPC ................ *F02C 7/04* (2013.01); *B64D 27/26* (2013.01); *B64D 29/02* (2013.01); *B64D 2027/262* (2013.01); *F05D 2230/60* (2013.01)

(58) Field of Classification Search
CPC .. F02K 1/00; F02C 7/04; B64D 27/26; B64D 27/262; B64D 27/18; B64D 29/02; B64D 29/06; B64D 33/02; F05D 2230/60
See application file for complete search history.

(56) References Cited

U.S. PATENT DOCUMENTS 3,735,946 A * 5/1973 Mullins .................. B64D 27/16
   244/54
3,765,623 A 10/1973 Donelson et al.
(Continued)

FOREIGN PATENT DOCUMENTS

EP 0241404 A2 10/1987
GB 2 064 005 A 6/1981
(Continued)

OTHER PUBLICATIONS

Sweetman, How the 737 Got Its Hamster Mouth, 2014 (Year: 2014).*
(Continued)

*Primary Examiner* — Edwin Kang
(74) *Attorney, Agent, or Firm* — Oliff PLC (57) ABSTRACT

A gas turbine engine (100) for an aircraft comprises a pylon attachment (112) and a shaft (108) defining an engine centreline (110). The engine centreline lies in an engine central plane (120) which intersects the pylon attachment. The gas turbine engine comprises an intake (104) having a non-axisymmetric geometry and a medial plane (130) defining left and right halves of the intake. The left and right halves are configured for at least one of optimum cross wind performance, optimum incidence performance and optimum cruise performance when the medial plane is aligned with a vertical plane. The intake is installed so that the medial plane is angularly offset with respect to the engine central plane. The engine may be installed on a wing of an aircraft with the medial plane closer to its optimal orientation than is the case for a conventional engine.

13 Claims, 9 Drawing Sheets

(51) Int. Cl.
*B64D 27/26* (2006.01)
*B64D 29/02* (2006.01)

(56) References Cited

U.S. PATENT DOCUMENTS

| | | | |
|---|---|---|---|
| 3,946,830 A | 3/1976 | Kutney et al. | |
| 4,220,171 A * | 9/1980 | Ruehr | B64D 33/02 |
| | | | 137/15.1 |
| 4,318,516 A * | 3/1982 | Cole | B64D 27/18 |
| | | | 244/54 |
| 4,449,680 A | 5/1984 | Gratzer et al. | |
| 4,449,683 A * | 5/1984 | Gratzer | B64D 29/02 |
| | | | 244/130 |
| 4,722,357 A | 2/1988 | Wynosky | |
| 4,801,058 A | 1/1989 | Mullins | |
| 5,058,617 A | 10/1991 | Stockman et al. | |
| 5,915,403 A | 6/1999 | McConachie et al. | |
| 6,328,258 B1 * | 12/2001 | Porte | B64D 33/02 |
| | | | 244/53 B |
| 6,764,043 B2 | 7/2004 | Sankrithi et al. | |
| 6,910,327 B2 | 6/2005 | Sakurai et al. | |
| 8,622,340 B2 | 1/2014 | Bensilum | |
| 9,505,499 B2 * | 11/2016 | Mauldin | B64C 7/02 |
| 10,112,696 B2 | 10/2018 | Chandler et al. | |
| 2003/0014964 A1 * | 1/2003 | Sathianathan | F01D 25/24 |
| | | | 60/226.1 |
| 2004/0113014 A1 * | 6/2004 | Sankrithi | F02C 7/042 |
| | | | 244/53 A |
| 2004/0255572 A1 * | 12/2004 | Porte | F02K 1/70 |
| | | | 60/226.1 |
| 2005/0022866 A1 | 2/2005 | Sakurai et al. | |
| 2006/0237582 A1 * | 10/2006 | Layland | F02C 7/047 |
| | | | 244/53 R |
| 2007/0051091 A1 * | 3/2007 | Rolt | F02K 3/06 |
| | | | 60/226.1 |
| 2009/0184198 A1 * | 7/2009 | Balk | B64D 27/26 |
| | | | 244/54 |
| 2010/0260602 A1 * | 10/2010 | Binks | B64D 29/08 |
| | | | 415/214.1 |
| 2011/0142615 A1 * | 6/2011 | Riou | F02K 3/06 |
| | | | 415/220 |
| 2011/0243719 A1 * | 10/2011 | Murphy | F02C 3/10 |
| | | | 415/182.1 |
| 2013/0032669 A1 * | 2/2013 | Porte | F01D 25/243 |
| | | | 244/131 |
| 2013/0048414 A1 * | 2/2013 | Gaudry | B64D 33/02 |
| | | | 181/213 |
| 2015/0184543 A1 * | 7/2015 | Fabre | E05B 11/02 |
| | | | 244/54 |
| 2015/0259059 A1 | 9/2015 | Chandler et al. | |
| 2015/0285144 A1 | 10/2015 | Todorovic et al. | |
| 2016/0039528 A1 * | 2/2016 | Caruel | F01D 25/24 |
| | | | 415/119 |
| 2017/0184124 A1 * | 6/2017 | Moniz | F01D 25/162 |
| 2018/0030926 A1 * | 2/2018 | Eckett | B64D 33/04 |
| 2018/0057150 A1 * | 3/2018 | Cheung | B64D 33/04 |
| 2018/0057942 A1 * | 3/2018 | Yanzhe | B33Y 10/00 |
| 2018/0141675 A1 * | 5/2018 | Halsey | F02C 6/10 |
| 2018/0320633 A1 * | 11/2018 | Moniz | F02K 3/06 |
| 2019/0063460 A1 * | 2/2019 | Costa | F04D 29/023 |
| 2019/0299269 A1 * | 10/2019 | Sommer | B21D 26/059 |

FOREIGN PATENT DOCUMENTS

| | | |
|---|---|---|
| GB | 1 599 730 A | 10/1981 |
| GB | 2 259 114 A | 3/1993 |

OTHER PUBLICATIONS

Goyal, Why the Newer Boeing 737 Engines Are Flat at the Bottom, 2018 (Year: 2018).*
Nov. 4, 2019 Extended Search Report issued in European Patent Application No. 19 17 7689.7.
Nov. 4, 2019 Extended Search Report issued in European Patent Application No. 19 17 7690.5.
Dec. 17, 2018 Search Report issued in Great Britain Patent Application GB1809822.8.
Mar. 14, 2019 Search Report issued in Great Britain Patent Application GB1815494.8.
U.S. Appl. No. 16/416,708, filed May 20, 2019 in the name of Christopher TJ Sheaf et al.
Jun. 18, 2021 Office Action issued in U.S. Appl. No. 16/416,708.
Aug. 9, 2021 Office Action Issued in U.S. Appl. No. 16/416,708.

* cited by examiner

GAS TURBINE ENGINE

CROSS-REFERENCE TO RELATED PATENT APPLICATIONS

This application is based upon and claims the benefit of priority from UK patent application no. GB 1809822.8 filed on Jun. 15, 2018 and UK patent application no. GB 1815494.8 filed on Sep. 24, 2018 the entire contents of each of which are incorporated by reference.

BACKGROUND

Technical Field

The present disclosure relates to gas turbine engines for aircraft and to aircraft.

Description of the Related Art

Gas turbine engines for aircrafts generally comprise air intakes. The purpose of an air intake is to direct air flow into the gas turbine engine with the least amount of flow distortion across a range of operating conditions. These conditions include a range of cross wind conditions while the aircraft is on the ground, and incidence conditions during aircraft take-off and climb. It is known to optimise the geometry of intakes for gas turbine engines for expected cross wind and incidence conditions, in which case an intake may be non-axisymmetric and have a preferred orientation with respect to an aircraft on which it is mounted.

BRIEF SUMMARY

According to a first aspect there is provided a gas turbine engine for an aircraft, comprising: a pylon attachment, a shaft defining an engine centerline, wherein the engine centerline lies in an engine central plane intersecting the pylon attachment, an intake having a non-axisymmetric geometry, the intake having a medial plane defining left and right halves of the intake; and wherein the medial plane of the intake is angularly offset with respect to the engine central plane.

The gas turbine engine may further comprise a nacelle, wherein the nacelle and the intake meet at an interface. The nacelle may have a circular external profile at the interface and the intake may have a corresponding circular external profile at the interface.

There may be a smooth transition of the external profiles between the intake and the nacelle. The circular external profiles of the intake and nacelle may allow for a smooth transition between the external profiles of the intake and the nacelle for any angular offset of the intake with respect to the nacelle. In other words, any amount of rotation of the intake with respect to the nacelle may be accommodated whilst maintaining a smooth transition of the external profiles between the nacelle and the intake.

The intake may have a non-circular external profile at the interface and the nacelle may have a non-symmetrical external profile with respect to the engine central plane so that the external profile of the nacelle at the interface corresponds with the external profile of the intake when the medial plane is angularly offset with respect to the engine central plane. The nacelle may comprise fan cowl doors, wherein the fan cowl doors define the non-symmetrical external profile of the nacelle.

The phrase 'fan cowl doors' is intended to mean the left and right panels that define the external profile of the nacelle. There may be a plurality of panels on each side of the engine. Such doors may be hinged for maintenance of internal components.

The external profile of the nacelle at the interface may correspond with the external profile of the intake when the medial plane is angularly offset from the engine central plane by a pre-determined angle.

The intake may define an upstream highlight line with respect to the engine centerline, the highlight line being non-symmetrical such that the intake is handed for use on a respective side of an aircraft.

The gas turbine engine may have a fan plane normal to the engine centerline. The intake may define a highlight plane defined by a plane bridging the highlight line, which is inclined with respect to the fan plane about an axis parallel to the intersection of the fan plane and the engine central plane. The gas turbine engine may be installable on one side of an aircraft so that the highlight plane faces upstream towards an aircraft centerline when the engine centerline is parallel with the aircraft centerline.

The intake may comprise a geometric centerline which curves away from the engine centerline in an upstream direction from an interface between the intake and a nacelle. The geometric centerline of the internal surface of the intake may curve away from the engine centerline in an upstream direction from an interface between the intake and a nacelle.

The left and right halves of the intake may be configured for at least one of optimum cruise performance, optimum incidence performance and optimum cruise performance when the medial plane is aligned with the vertical plane.

According to a second aspect, there is provided an aircraft comprising left and right gas turbine engines in accordance with the first aspect, wherein the medial plane of the left engine is angularly offset with respect to the engine central plane of the left engine in a first angular direction, and wherein the medial plane of the right engine is angularly offset with respect to the engine central plane of the right engine in a second, different, angular direction.

The medial plane of a given gas turbine engine may be offset from the engine central plane of the engine such that the medial plane is more closely aligned to the vertical plane in use than the engine central plane.

The aircraft may comprise four engines, wherein two engines on one side of the aircraft have different angular offsets between the medial plane and the respective engine central plane.

The intake of each engine may define a respective upstream highlight plane. The intakes may be handed for the respective left and right sides of the aircraft such that, when viewed from above, the highlight plane of each engine is inclined with respect to the respective engine centerline to face towards the aircraft centerline.

The left and right gas turbine engines may be mounted to the aircraft such that the engine centerline is substantially parallel to the aircraft centerline.

According to a third aspect, there is provided a method comprising: providing a gas turbine engine having an intake mounted to a fan case enclosed by a nacelle; rotating the intake with respect to the fan case and the nacelle to accommodate for installed roll of the gas turbine engine.

Rotating the intake may comprise detaching the intake and re-attaching the intake at a different angular orientation with respect to the fan case and the nacelle.

The intake may be mounted to a nacelle by means of a plurality of bolts secured around an intake flange of the intake and a fan case flange of the fan case. The plurality of bolts may be equally spaced around the intake and fan case flanges.

The method may comprise attaching the gas turbine engine to a wing using a pylon attachment and rotating the intake with respect to the fan case and the nacelle before or after attachment of the gas turbine engine to the wing.

As noted elsewhere herein, the present disclosure may relate to a gas turbine engine. Such a gas turbine engine may comprise an engine core comprising a turbine, a combustor, a compressor, and a core shaft connecting the turbine to the compressor.

Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centerline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as dH/Utip2, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being Jkg-1K-1/(ms-1)2). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1s, 105 Nkg-1s, 100 Nkg-1s, 95 Nkg-1s, 90 Nkg-1s, 85 Nkg-1s or 80 Nkg-1s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15 deg C. (ambient pressure 101.3 kPa, temperature 30 deg C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85.

Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55 deg C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE SEVERAL VIEWS OF THE DRAWINGS

Embodiments will now be described by way of example only, with reference to the accompanying Figures, in which.

DETAILED DESCRIPTION

Figure 1:
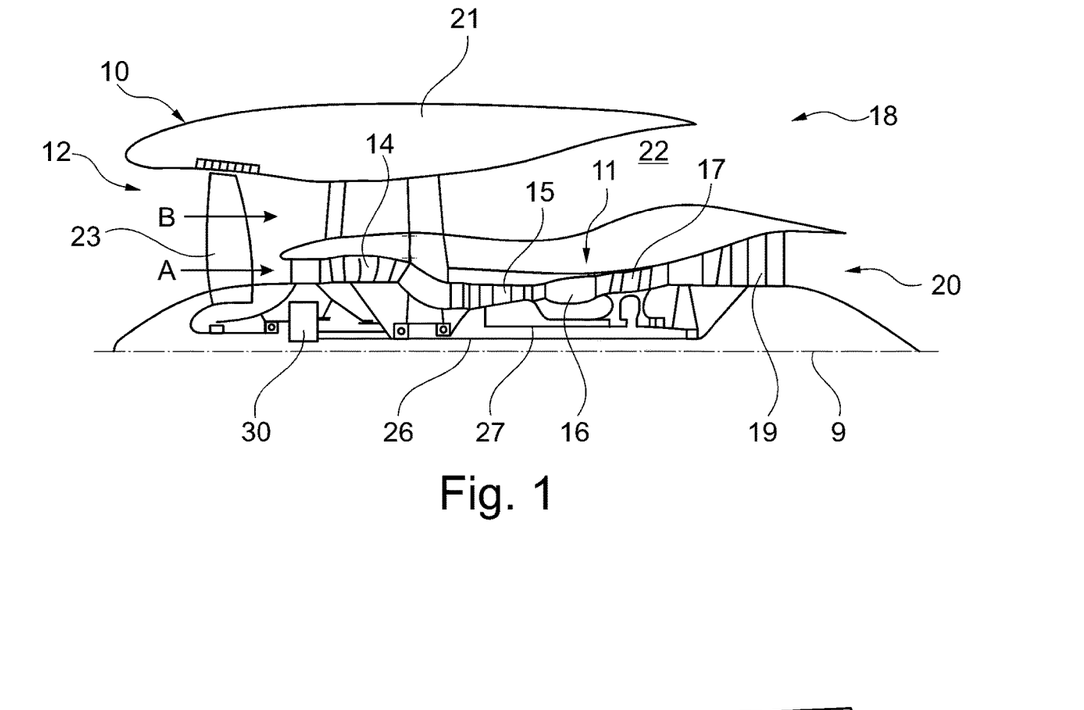
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
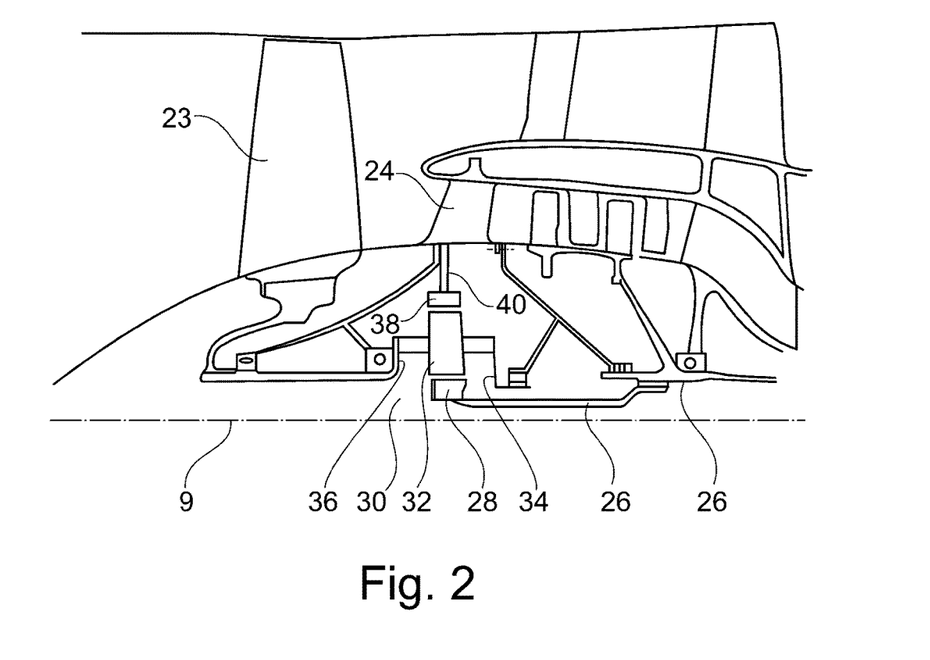
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
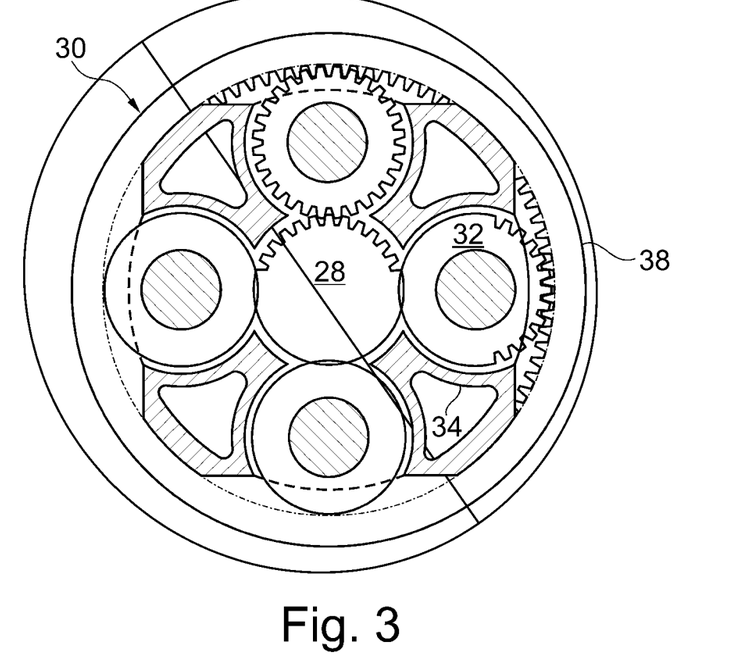
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3.

There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
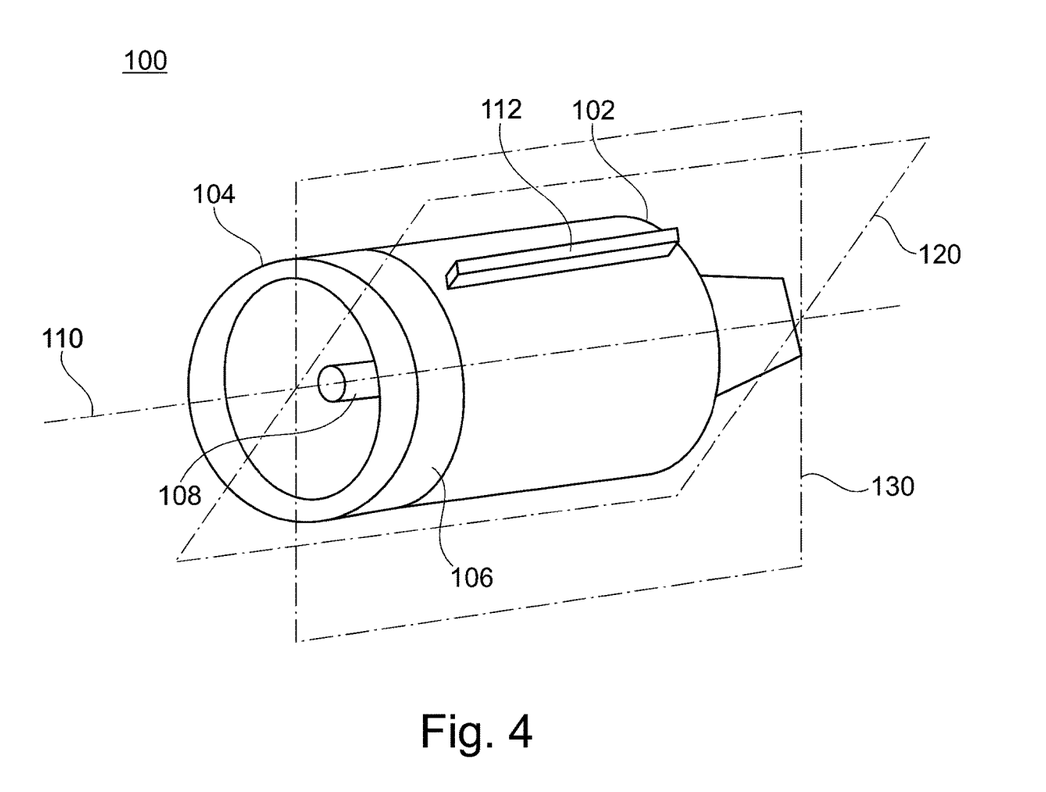
FIG. 4 schematically shows an oblique view of a gas turbine engine with a rotated intake.
Figure 5:
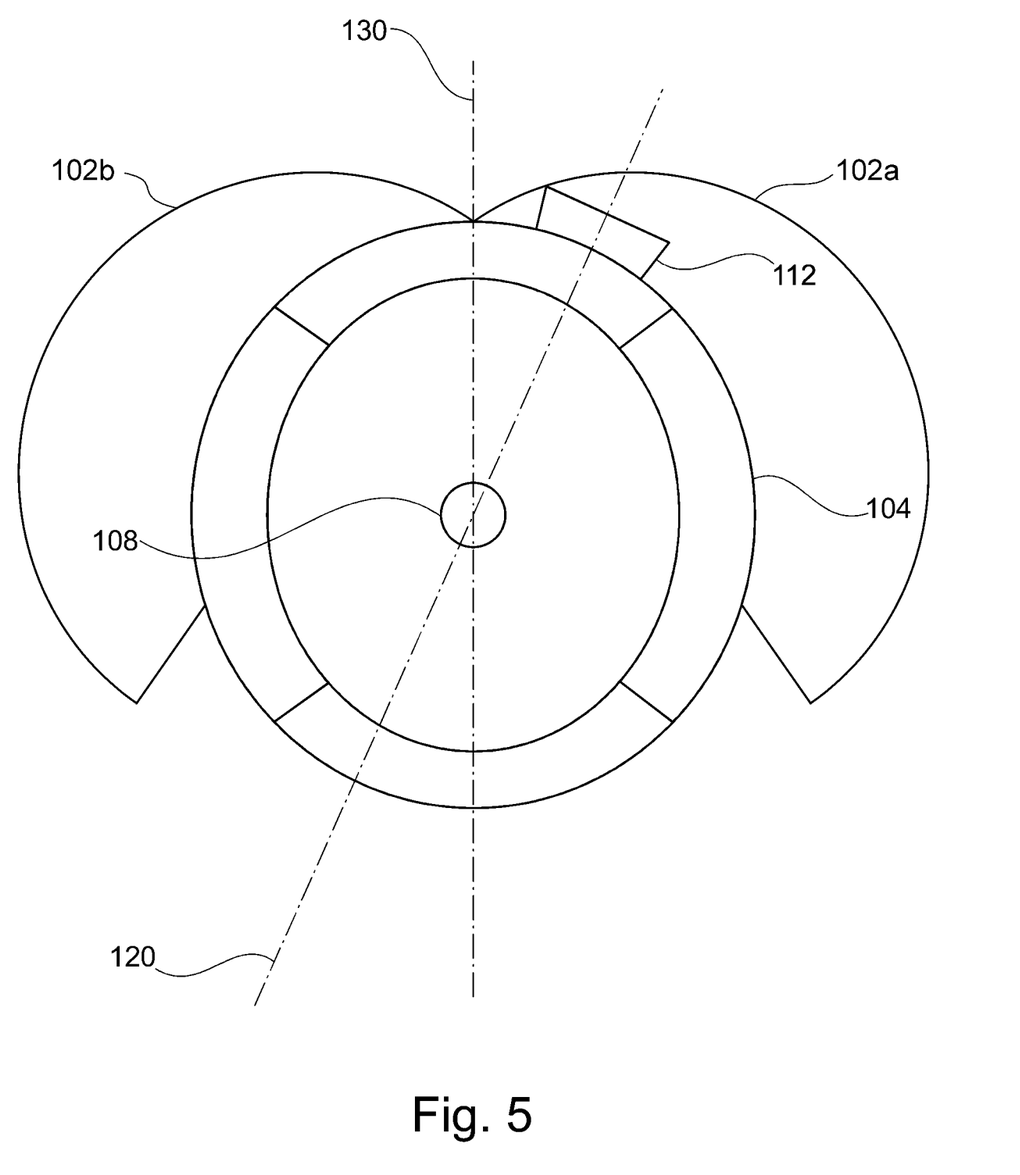
FIG. 5 schematically shows a front view of the gas turbine engine of FIG. 4.

FIGS. 4 and 5 show an oblique view and a front view of a gas turbine engine 100 respectively. The gas turbine engine 100 comprises a nacelle 102 enclosing a fan case (not shown) and an intake 104. The intake 104 is mounted to the fan case, so that the intake 104 and nacelle 102 meet at an interface 106.

In this simplified example, the nacelle 102 appears cylindrical (i.e. has a circular external profile), but in other examples it may be non-cylindrical. The intake 104 has a non-axisymmetric geometry at an upstream end of the intake 104, which is configured to provide an optimal cross wind and incidence performance when mounted to an aircraft in a specific (i.e. predetermined) orientation. The profile of the intake 104 at the interface 106 is circular and corresponds with the external profile of the nacelle 102 at the interface 106 (which is also circular), so as to provide a smooth transition between the intake 104 and the nacelle 102 at the interface 106. In other examples, the profile of the nacelle at the interface is circular to provide a smooth transition but non-circular (non-axisymmetric) downstream of the interface 106. An intake may comprise an outer cowl surface and an internal diffuser surface, and in a further example the outer cowl surface is circular at a first interface with a nacelle and the internal diffuser surface is circular at a second interface with a fan case enclosed by the nacelle, the first and second interfaces being located at different axial positions.

In some examples, the intake may define a non-circular profile at the interface. In such examples, the nacelle may have a corresponding non-circular profile at the interface to provide a smooth transition between the nacelle and the intake. The nacelle may comprise fan cowl doors which are handed and which define the non-circular profile of the nacelle at the interface.

The nacelle 102 encloses a core of the engine 100 including a shaft 108 on which a fan (not shown) is mounted, and the shaft 108 defines an engine centerline 110. The nacelle 102 comprises a pylon attachment 112 for attaching the gas turbine engine 100 to an aircraft. The engine centerline 110 lies within an engine central plane 120, which intersects the pylon attachment 112, so that the engine central plane 120 bisects the gas turbine engine 100 through the pylon attachment 112.

The intake 104 has a medial plane 130 defining left and right halves of the intake 104. The left and right halves of the intake 104 have a geometry configured for optimum cross wind and incidence performance when the medial plane 130 is aligned with a vertical plane in use. In some examples, the left and right halves may be symmetrical about the medial plane, whereas in other examples, the intake may be handed so that the halves are non-symmetrical and the intake is configured for a particular side of an aircraft. FIG. 5 shows the medial plane 130 offset in an anti-clockwise direction with respect to the engine central plane 120 in a front view of the engine 100, but in other examples the medial plane may be offset in a clockwise direction with respect to the engine central plane in a front view.

The intake 104 is mounted to the fan case such that the medial plane 130 is angularly offset with respect to the engine central plane 120. In this example, the medial plane 130 is angularly offset from the engine central plane 120 by approximately 15 degrees. In other examples, the intake may be rotated with respect to the nacelle so that the medial plane is offset from the engine central plane by more or less than 15 degrees, for example in a range between 1 and 20 degrees, or approximately 20 degrees, or approximately 10 degrees. The medial plane may be offset from the engine central plane by at least 1 degree.

The circular external profiles of the intake 104 and the nacelle 102 at the interface 106 in this example allows for a smooth transition between the intake 104 and the nacelle 102 when the intake 104 is in any orientation with respect to the nacelle 102.

In other examples, where the intake 104 has a non-circular profile at the interface 106, the nacelle 102 may have a non-symmetrical profile at the interface 106 defined by the fan cowl doors 102a, 102b. The profile defined by the fan cowl doors 102a, 102b may correspond to the intake 104 at the interface 106, when the medial plane 130 of the intake 104 is angularly offset by a predetermined amount from the engine central plane 120. The intake 104 may be offset (i.e. by offsetting the medial plane 130 relative the engine central plane 120) by the predetermined amount in a clockwise direction or an anti-clockwise direction, and the fan cowl doors 102a, 102b may be handed so as to accommodate a predetermined angular offset in either direction. The term handed is intended to mean a non-symmetrical left-right configuration such that the respective part or engine is adapted for use on a particular side of an aircraft.

Figure 6:
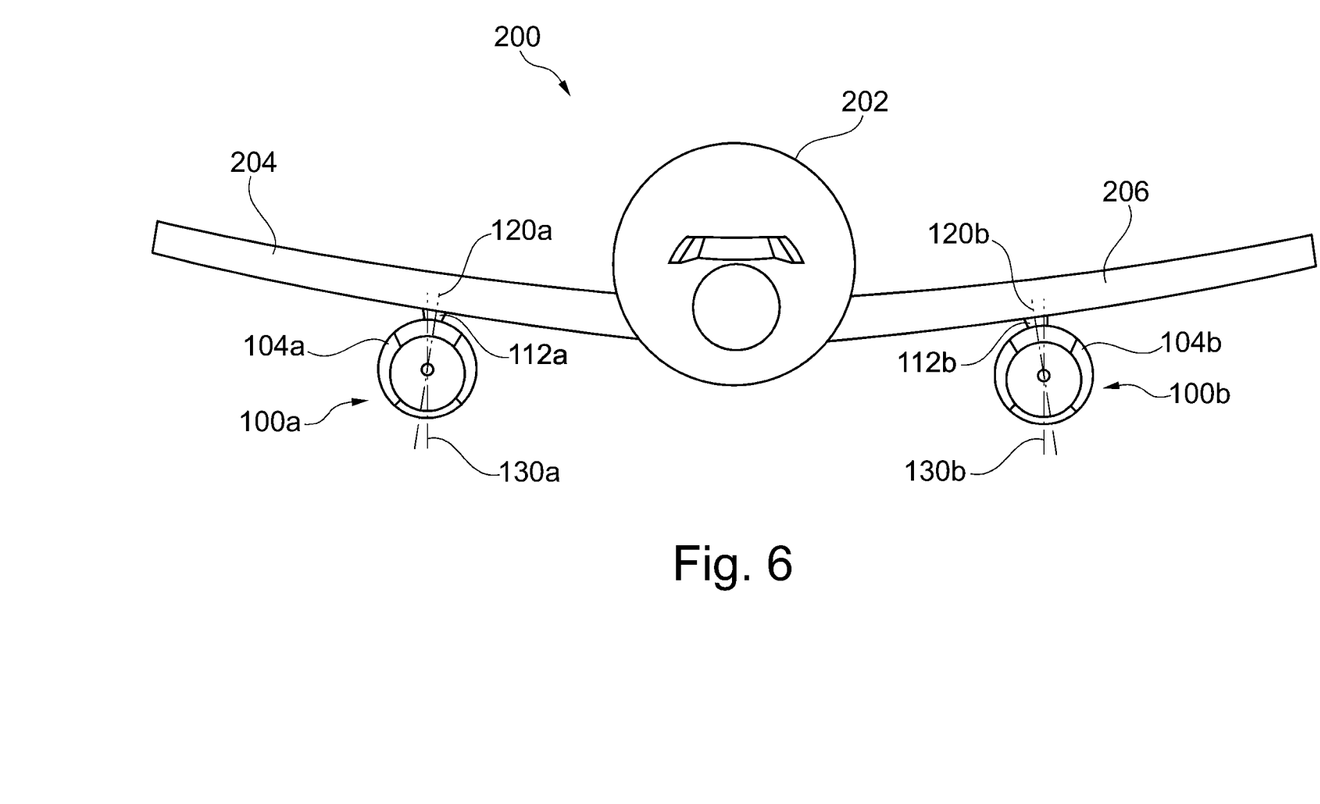
FIG. 6 schematically shows a front view of an aircraft having two gas turbine engines with rotated intakes.

FIG. 6 shows a front view of an aircraft 200 comprising a fuselage 202, a left wing 204, a right wing 206, and left and right gas turbine engines 100a, 100b which each comprise the same features as the gas turbine engine 100 described with reference to FIGS. 4 and 5. For simplicity of description, the wing on the left of the drawings is described as the left wing, although it will be appreciated that this is the pilot's right wing (or starboard).

The left wing 204 and the right wing 206 are mounted to the fuselage 202 so that they extend away from the fuselage 202 along a direction angled upwards with respect to the horizontal. The angle may reflect the configuration of the wing when the aircraft is idle on the ground or in flight. The angle may vary over the span of the wing and may vary depending on the lift on the wing. The left gas turbine 100a engine is mounted to the left wing 204 by its pylon attachment 112a and the right gas turbine engine 100b is mounted to the right wing 206 by its pylon attachment 112b.

Due to the angle of the left wing 204 with respect to the horizontal, the left gas turbine engine 100a is rolled in a first direction (clockwise in FIG. 6) such that the engine central plane 120a is rolled in the first direction relative the vertical plane to align the pylon attachment 112a with the corresponding part of the wing 204. In this example, the left gas turbine engine 100a is mounted to the left wing 204 such that the respective engine central plane 120a is angularly offset from the vertical plane by approximately 6 degrees in the first direction (clockwise).

Due to the angle of the right wing 206 with respect to the horizontal, the right gas turbine engine 100b is rolled in a second direction (anti-clockwise in FIG. 6) such that the respective engine central plane 120b is rolled in the second direction relative the vertical plane to align the pylon attachment 112b with the corresponding part of the wing 206. In this example, the right gas turbine engine 100b is mounted to the right wing 206 such that the engine central plane 120b is angularly offset from the vertical plane by approximately 6 degrees in the second direction (anti-clockwise).

In other examples, the left and right gas turbine engines may be mounted to the left and right wings respectively such that the engine central planes are offset by more than 6 degrees or less than 6 degrees relative the vertical, for example in a range between 1 and 20 degrees. In some examples, the left and right gas turbine engines may be mounted to the respective left and right wings such that the engine central plane is angularly offset from the vertical plane by at least 1 degree. The engine central plane may be angularly offset from the vertical plane by 6 degrees or less.

The intake 104a of the left gas turbine engine 100a is rotated in the second direction (anti-clockwise) relative the nacelle 102a such that the medial plane 130a is rotated in the second direction relative the engine central plane 120a. The intake 104b of the right gas turbine engine 100b is rotated in the first direction (clockwise) relative the nacelle 102b such that the medial plane 130b is rotated in the first direction relative the engine central plane 120b.

The intakes 104a, 104b are rotated so that the medial planes 130a, 130b are rotated relative the respective engine central planes 120a, 120b to be closer to the vertical plane in use, for example in an idle configuration of the aircraft and/or during cruise. This adjusts for the roll of a nacelle 102a, 102b of an engine 100a, 100b so that the intake 104a, 104b of the engine is oriented closer to its optimal cross wind and incidence performance when the engine is mounted to the wing. In this example, the intakes 104a, 104b are rotated such that their respective medial planes 130a, 130b are aligned with the vertical plane in cruise, so that they are oriented for optimum cross wind and incidence performance. Therefore, the medial plane 130a of the left gas turbine engine 100a is angularly offset from the respective engine central plane 120a by approximately 6 degrees in the second direction (anti-clockwise) and the medial plane 130b of the right gas turbine engine 100b is angularly offset from the respective engine central plane 120b by approximately 6 degrees in the first direction (clockwise). In other examples, the medial planes may not be aligned with the vertical plane, but may be brought closer to it than the engine central plane 120 by virtue of the offset.

Figure 10:
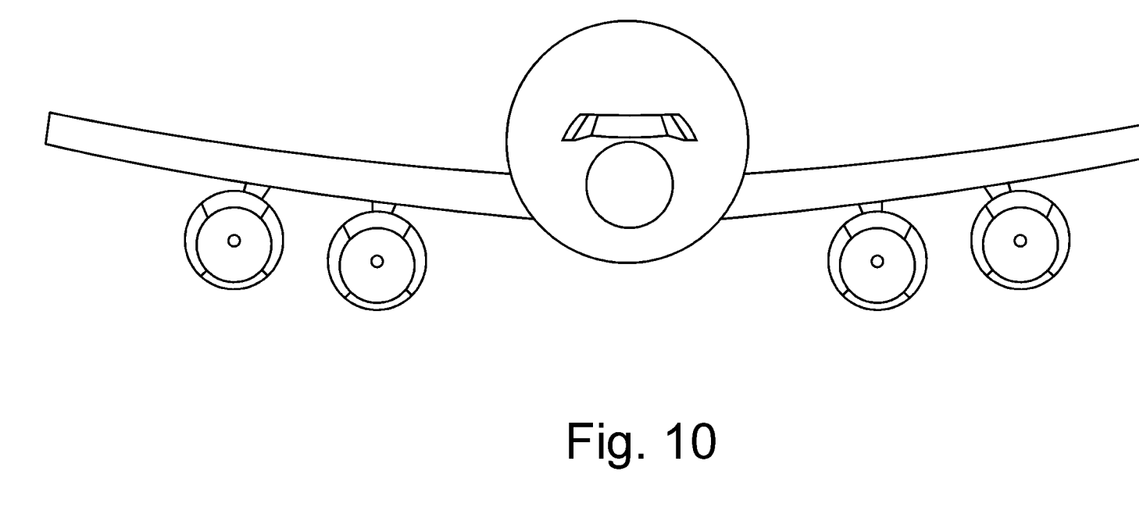
FIG. 10 schematically shows a front view of an aircraft having four gas turbine engines with rotated intakes.

Although there are only two gas turbine engines described in this example, in other examples there may be more than two gas turbine engines mounted to an aircraft. For example, an aircraft may comprise four gas turbine engines (see FIG. 10), with two gas turbine engines mounted on each wing. In some examples, an aircraft may comprise two gas turbine engines mounted to each wing, where the two gas turbine engines on each wing (one side of the aircraft) may have different angular offsets between the medial planes and the respective engine central planes. In yet other examples, there may be two gas turbine engines mounted in any position on an aircraft such as overwing, rear fuselage or blended wing-body aircraft.

In some examples, the intake 104 of a gas turbine engines 100 may be mounted to the fan case of the engine at the desired orientation before the gas turbine engine 100 is mounted to a wing. In other examples, the intake 104 may be adjusted relative the nacelle 102 after the gas turbine engines 100 has been mounted to a wing, for example by detaching, re-positioning and re-attaching the intake.

Figure 7:
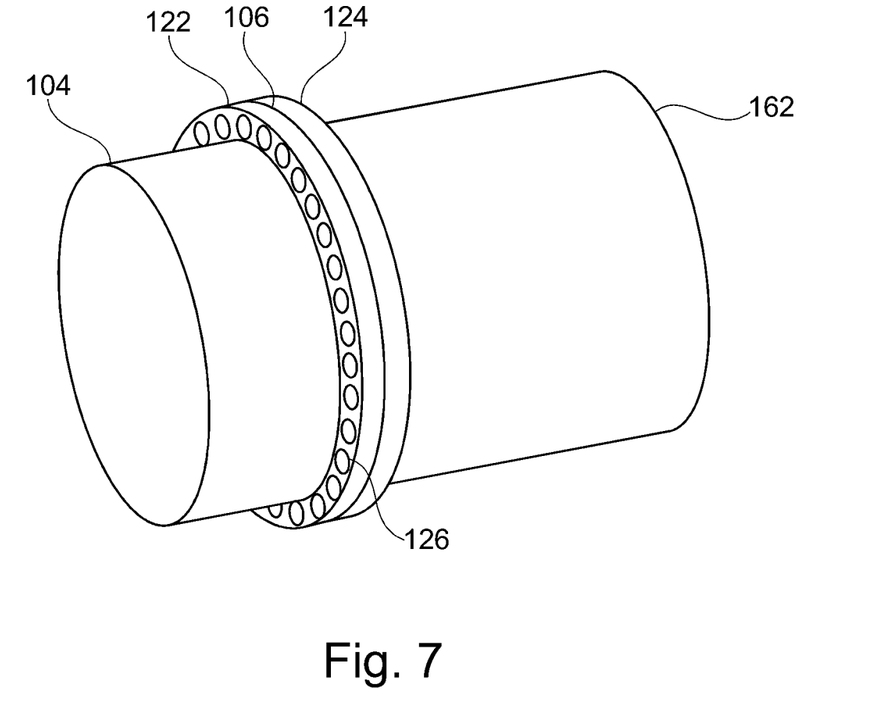
FIG. 7 schematically shows an interface between an intake and a fan case of the gas turbine engine.

FIG. 7 shows an oblique view of selected internal parts of the intake 104 and the fan case 162 by which the intake 104 and the fan case 162 are mounted to one another. The intake 104 comprises an intake flange 122 and the fan case 162 comprises a fan case flange 124 (which may otherwise be known as a flange of a casing). The intake flange 122 and the fan case flange 124 have corresponding circular profiles.

The intake flange 122 comprises a plurality of bolt holes 126 evenly spaced around the flange 122. The fan case flange 124 comprises a corresponding plurality of bolt holes (not shown) evenly spaced around the flange 124. The intake 104 and fan case 162 may therefore be attached together by means of a plurality of bolts through the bolt holes 126.

In the example arrangement shown in FIG. 7, each flange 122, 124 comprises 60 bolt holes 126, where the center of each bolt hole 126 is angularly spaced from an adjacent bolt hole 126 by 6 degrees. The intake 104 may therefore be rotated relative the fan case 162 and nacelle 102 by multiples of 6 degrees. Since the bolt holes are spaced apart evenly around each flange, the intake 104 can be rotated relative the fan case 162 and nacelle 102 by any multiple of 6 degrees and still be mounted to the fan case 162 by means of bolts through the bolt holes 126, without distorting the intake 104, the fan case 162 or the nacelle 102. The gas turbine engine 100 thus comprises means providing for the angular offset between the medial plane 130 and the engine central plane 120 to be adjusted. The intake 104 is detachable from the fan case 162 and nacelle 102.

In other examples, there may be any number of bolt holes which are equally spaced apart from one another around each flange. The more bolt holes there are in each flange, the more precisely the intake 104 can be adjusted to accommodate the roll of the gas turbine engine 100 when mounted to an aircraft wing.

In one example engine, the external cowl surface of the intake meets the nacelle at a first circular interface, and the internal diffuser surface of the intake meets the fan case at a second circular interface downstream of the first circular interface. In this example, the internal diffuser surface forms a spigot which extends within the nacelle when the intake is mounted to the fan case.

Figure 8:
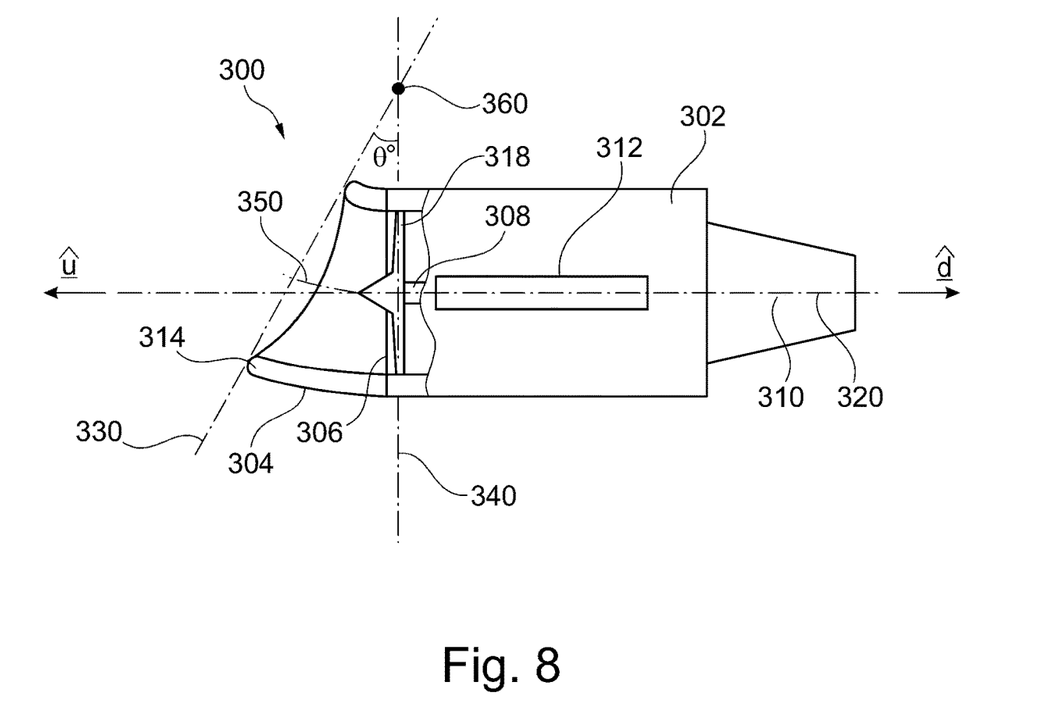
FIG. 8 schematically shows a plan cutaway view of a gas turbine engine with a handed intake.

FIG. 8 shows a cutaway view of a handed gas turbine engine 300, for installation on one side of an aircraft. The handed gas turbine engine 300 comprises a nacelle 302 enclosing a fan case (not shown) and an intake 304, where the intake 304 is mounted to the fan case and is configured to provide optimised cross wind and incidence performance when mounted to an aircraft on a specific side of an aircraft and in a specific angular orientation.

The nacelle 302 of this example is the same as the nacelle 102 as described with reference to FIGS. 4 and 5, and encloses a shaft 308 on which a fan 318 is mounted. The shaft 308 defines an engine centerline 310. Unit vectors û, d̂ in the upstream and downstream directions of the engine 300 are parallel to the engine centerline 310 and mutually anti-parallel. The fan 318 is located on an upstream end of the shaft 308, and defines a fan plane 340, which is normal to the engine centerline 310. The intake 304 is mounted to the fan case on an upstream end of the fan case so that the external profiles of the intake 204 and nacelle 302 meet at an interface 306.

The nacelle 302 comprises a pylon attachment 312 for attaching the nacelle 302 to an aircraft, in the same manner as the pylon attachment 112 of gas turbine engine 100. The pylon attachment 312 extends parallel to the engine centerline 310. The engine centerline 310 lies in an engine central plane 320 which intersects the pylon attachment 312, such that the engine central plane 320 bisects the portion of the gas turbine engine 300 downstream of the interface 306 through the pylon attachment 312.

The intake 304 defines a lip 314 around an upstream end of the intake 304. A locus of the extreme upstream points of the lip 314, with respect to the engine centerline 310 at each angular position around the intake 304, defines an upstream highlight line. The highlight line is non-symmetrical about a vertical plane through the engine centerline 310 such that the intake 304 is handed for a respective side of an aircraft. A highlight plane 330 is defined which bridges the highlight line (i.e. which touches the highlight line at multiple points but does not cross it).

In this example, the intake 304 extends further along the upstream direction on one side of the engine central plane 320 than on the other side of the engine central plane 320. Therefore, a geometric centerline 350 of the intake 304 curves away from the engine centerline 310 to one side of the engine central plane 320 (i.e. the intake 304 curves to one side of the engine central plane 320). The highlight plane 330 is therefore angled with respect to the fan plane 340, around an axis 360 which is parallel to an axis defined by the intersection of the fan plane 340 with the engine central plane 320. The angular offset of the highlight plane 330 relative the fan plane 340 is exaggerated in FIG. 8 and appears as approximately 30 degrees. However, in examples, the angle between the highlight plane and the fan plane may be any suitable angle such as in a range of between 1 and 5 degrees. In some examples, the angle between the highlight plane and the fan plane may be 1 degree or more.

Figure 9:
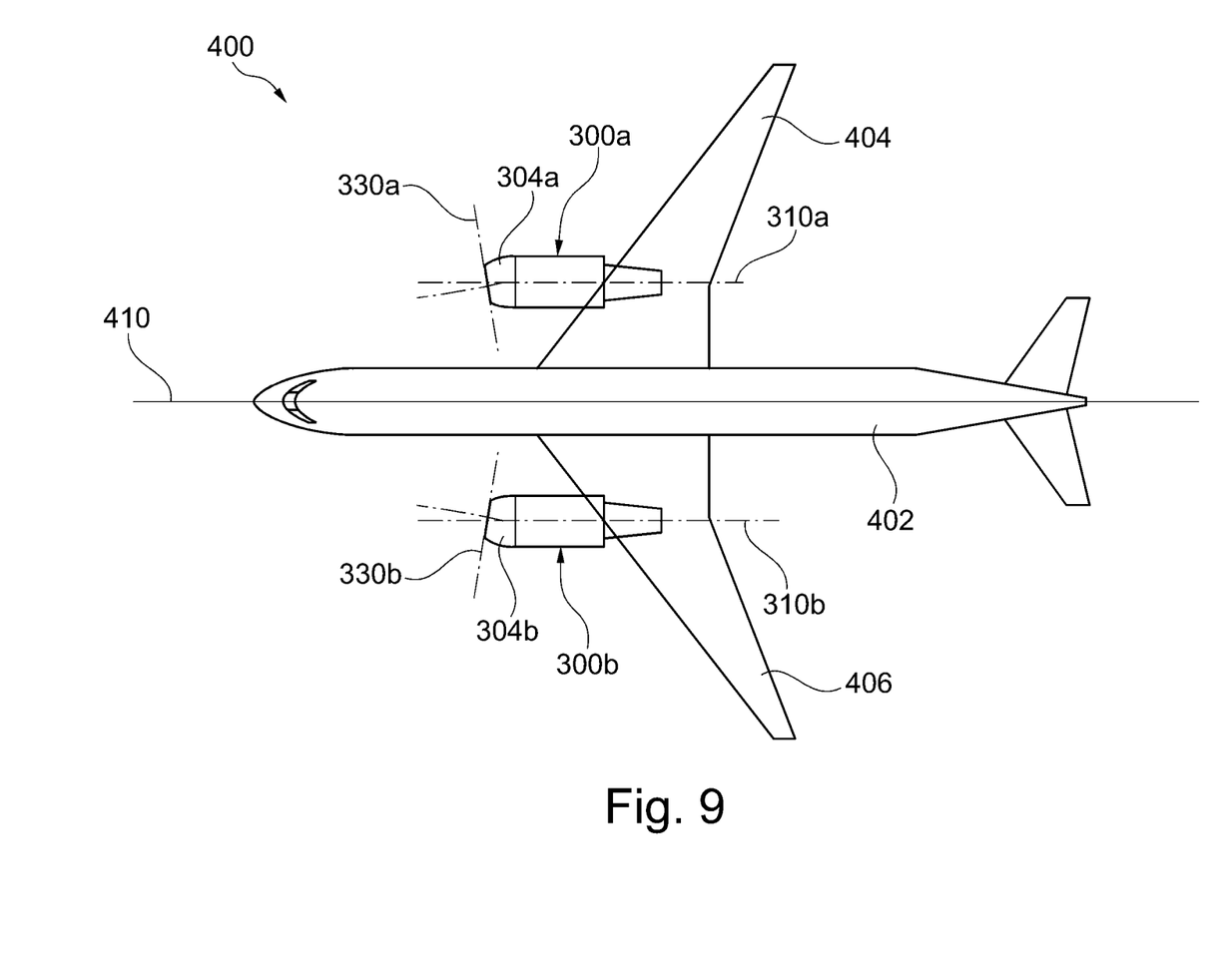
FIG. 9 schematically shows a plan view of an aircraft having two gas turbine engines with handed intakes.

FIG. 9 shows a plan view of an aircraft 400 having a fuselage 402, a left wing 404, a right wing 406, and left and right gas turbine engines 300a, 300b as described with reference to FIG. 8. The left and right gas turbine engines 300a, 300b are installed on the left and right wings 404, 406 of the aircraft 400 respectively.

The intakes of the left and right gas turbine engines 300a, 300b are handed in opposing directions such that they are mirror images of one another about a vertical plane containing an aircraft centerline 410 (defined by a longitudinal axis of the fuselage 402). In other words, the intakes of the left and right gas turbine engines 300a, 300b curve in opposing directions. The intakes 304a, 304b of the respective left and right gas turbine engines 300a, 300b curve towards the aircraft centerline 410 so that the highlight planes 330a, 330b of the respective left and right gas turbine engines 300a, 300b face towards the aircraft centerline 410.

In this example, the left and right gas turbine engines 300a, 300b are mounted to the left and right wings respectively so that the respective engine centerlines 310a, 310b are substantially parallel to the aircraft centerline 410. In other examples, the gas turbine engines may be mounted so that the respective engine centerlines are not parallel to the aircraft centerline (i.e. such that the engine is mounted with a non-zero toe-in angle).

Having a handed intake 304 on a gas turbine engine 300 as described means that geometry can be optimised for receiving air flow on a specific side of the aircraft, without the need to toe-in the gas turbine engine (i.e. mount the gas turbine engine at an angle about a vertical axis). The cross wind and incidence performance of the gas turbine engine 300 can be improved by facing the highlight plane 330 towards the aircraft centerline 410 (i.e. the handed inlet can capture the ideal inlet flow to maximise aerodynamic performance of the inlet), whilst the direction of the exhaust of the gas turbine engine 300 can be maintained at or near the direction of travel of the aircraft 400 (i.e. in the direction of the aircraft centerline 410), thus reducing the trade-off between improving the cross wind and incidence performance of the intake, and maintaining the thrust performance of the gas turbine engines 300 on the aircraft 400.

The handed gas turbine engine 300 may be rolled as described with reference to FIG. 6 when mounted to an aircraft wing. The intake 304 of the handed gas turbine engine 300 may comprise a medial plane as described with reference to FIGS. 4-7 such that the medial plane defines left and right halves of the intake which left and right halves have a geometry configured for optimum cross wind and incidence performance when the medial plane is aligned with a vertical plane in use. The intake 304 may be mounted to the fan case with a plurality of bolts in the manner described with reference to FIG. 7. Therefore, the intake 304 of the handed gas turbine engine 300 may be adjusted by rotating the intake 304 to angularly offset the medial plane from the engine central plane 320, to accommodate for roll of the handed gas turbine engine 300 when mounted to an aircraft wing, in the same manner as described above. A handed gas turbine engine can be mounted to an aircraft in any position, such as overwing, rear fuselage or blended wing-body aircraft or at the tail of an aircraft.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

Notation: $\hat{x}=\hat{\underline{x}}$ means a unit vector in the positive x-direction.

What is claimed is:

1. A gas turbine engine for an aircraft, comprising:
a pylon attachment for attaching the gas turbine engine to a wing of the aircraft;
a shaft defining an engine centerline, wherein the engine centerline lies in an engine central plane intersecting the pylon attachment;
an intake having a non-axisymmetric geometry, the intake having a medial plane defining left and right halves of the intake;
a fan case, wherein the intake is mounted to the fan case; and
a nacelle enclosing the fan case, wherein:
the engine central plane and medial plane are angularly offset,
the intake and the nacelle meet at an interface,
the gas turbine engine comprises means for adjusting an angular offset between the medial plane of the intake and the engine central plane by rotating the intake and the medial plane with respect to the fan case and the nacelle,
the left and right halves of the intake are defined prior to rotating the medial plane,
the means for adjusting the angular offset comprises a radially extending intake flange of the intake, a radially extending fan case flange of the fan case, and a plurality of axially extending bolts secured around the radially extending intake flange and the radially extending fan case flange mounting the intake and the fan case together,
the radially extending fan case flange extends radially starting from a radially outermost surface of the fan case and has a diameter greater than the radially outermost surface of the fan case and the radially extending intake flange extends radially starting from a surface of the intake and has a diameter greater than the surface of the intake.

2. The gas turbine engine according to claim 1, wherein the nacelle has a circular external profile at the interface and the intake has a corresponding circular external profile at the interface.

3. The gas turbine engine according to claim 1, wherein:
the intake and the nacelle have a non-circular, non-symmetrical external profile at the interface.

4. The gas turbine engine according to claim 3, wherein the nacelle comprises fan cowl doors, and wherein the fan cowl doors define the non-symmetrical external profile of the nacelle.

5. The gas turbine engine according to claim 1, wherein the intake defines an upstream highlight line with respect to the engine centerline, and wherein the upstream highlight line is non-symmetrical such that the intake is handed for use on a respective side of the aircraft.

6. The gas turbine engine according to claim 5, having a fan plane normal to the engine centerline;
wherein the intake defines a highlight plane defined by a plane bridging the upstream highlight line, which is inclined with respect to the fan plane about an axis parallel to the intersection of the fan plane and the engine central plane;
whereby the gas turbine engine is installable on one side of the aircraft so that the highlight plane faces upstream towards an aircraft centerline when the engine centerline is parallel with the aircraft centerline.

7. The gas turbine engine according to claim 5, wherein the intake comprises a geometric centerline which curves away from the engine centerline in an upstream direction from the interface between the intake and the nacelle.

8. The gas turbine engine according to claim 1 wherein the left and right halves of the intake are configured for at least one of optimum cross wind performance, optimum incidence performance and optimum cruise performance when the medial plane is aligned with a vertical plane.

9. The aircraft comprising at least one left gas turbine engine and at least one right gas turbine engine, each in accordance with claim 1, wherein the medial plane of the at least one left gas turbine engine is angularly offset with respect to the engine central plane of the at least one left gas turbine engine in a first angular direction, and wherein the medial plane of the at least one right gas turbine engine is angularly offset with respect to the engine central plane of the at least one right gas turbine engine in a second, different, angular direction.

10. The aircraft according to claim 9, wherein the medial plane of one of the at least one left gas turbine engine and the at least one right gas turbine engine is offset from the engine central plane of the one of the at least one left gas turbine engine and the at least one right gas turbine engine such that the medial plane of the one of the at least one left gas turbine engine and the at least one right gas turbine engine is more closely aligned to a vertical plane in use than the engine central plane of the one of the at least one left gas turbine engine and the at least one right gas turbine engine.

11. The aircraft according to claim 9, wherein the at least one left gas turbine engine and the at least one right gas turbine engine includes two left engines and two right engines such the aircraft comprises four gas turbine engines, wherein one of the two left engines and the two right engines have different angular offsets between the medial plane and the engine central plane of each engine of the one of the two left engines and the two right engines.

12. The aircraft according to claim 9, wherein the intake of each engine defines a respective upstream highlight plane; wherein the intakes are handed for respective left and right sides of the aircraft such that, when viewed from above, the respective upstream highlight plane of each engine is inclined with respect to the engine centerline of each engine to face towards an aircraft centerline.

13. The aircraft according to claim 12, wherein the at least one left gas turbine engine and the at least one right gas turbine engine are mounted to the aircraft such that the engine centerline of each engine is substantially parallel to the aircraft centerline.

\* \* \* \* \*